(12) United States Patent
Shepherd et al.

(10) Patent No.: US 9,049,095 B2
(45) Date of Patent: Jun. 2, 2015

(54) METHODS AND DEVICES FOR PROVIDING INGRESS ROUTING IN SELECTIVE RANDOMIZED LOAD BALANCING

(75) Inventors: Frederick Bruce Shepherd, Summit, NJ (US); Marina K. Thottan, Westfield, NJ (US); Peter J. Winzer, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 704 days.

(21) Appl. No.: 11/647,273

(22) Filed: Dec. 29, 2006

(65) Prior Publication Data
US 2008/0159138 A1     Jul. 3, 2008

(51) Int. Cl.
| G01R 31/08 | (2006.01) |
| H04L 12/701 | (2013.01) |
| H04L 12/707 | (2013.01) |
| H04L 12/725 | (2013.01) |
| H04L 12/801 | (2013.01) |
| H04L 12/803 | (2013.01) |
| H04L 12/851 | (2013.01) |
| H04L 12/841 | (2013.01) |

(52) U.S. Cl.
CPC ............... *H04L 45/00* (2013.01); *H04L 45/24* (2013.01); *H04L 45/302* (2013.01); *H04L 47/10* (2013.01); *H04L 47/125* (2013.01); *H04L 47/24* (2013.01); *H04L 47/283* (2013.01)

(58) Field of Classification Search
USPC ...................................... 370/216–228, 230.1
See application file for complete search history.

(56) References Cited

U.S. PATENT DOCUMENTS

| 2004/0064583 A1 | 4/2004 | Dani et al. | |
| 2005/0185584 A1* | 8/2005 | Nagesh et al. | 370/235 |
| 2005/0195741 A1* | 9/2005 | Doshi et al. | 370/230 |
| 2007/0041326 A1* | 2/2007 | Babiarz et al. | 370/237 |

OTHER PUBLICATIONS

Hurkens et al, Virtual private network design: a proof of the tree routing conjecture on ring networks, Nov. 18, 2004, pp. 1-21.
Leung et al, "Capacity planning of survivable mesh-based transport networks under demand uncertainty", Photonic Network Communications, 10:2, 123-140, 2005.
Mitra, "Randomized parallel communications on an extension of the omega network", Journal of the Association for Computing Machinery, vol. 34, No. 4, Oct. 1987, pp. 802-824.
Widjaja et al, "Exploiting parallelism to boost data-path rate in high-speed IP/MPLS networking", IEEE INFOCOM 2003.
Winzer et al, "Robust network design and selective randomized load balancing", ECOC 2005 Proceedings—vol. 1, Paper Mo3.3.1.
Altin et al, "Provisioning virtual private networks under traffic uncertainty", pp. 1-21.

(Continued)

*Primary Examiner* — Jung-Jen Liu
(74) *Attorney, Agent, or Firm* — Capitol, Patent & Trademark Law Firm PLLC

(57) ABSTRACT

The performance of randomized load balanced or selective, randomized load balanced networks is enhanced by using ingress traffic engineering in addition to randomized traffic splitting. By first using the capacity of all links leading to the final destination of traffic, the remaining capacity is freed up for best effort traffic. Traffic splitting rules that enhance the performance of randomized load balanced networks in terms of packet missequencing and other quality of service criteria are also described.

6 Claims, 1 Drawing Sheet

(56) References Cited

OTHER PUBLICATIONS

Applegate et al., "Making intra-domain routing robust to changing and uncertain traffic demands: Understanding fundamental tradeoffs", Proceedings ACM SIGCOMM, pp. 313-324, 2003.

Ben-Ameur et al., "Routing of uncertain demands", Optimization and Engineering, 2005.

Chang et al., "Load balanced Birkoff-von Neumann Switches, Part I: One-stage buffering", IEEE Workshop on High Performance Switching and Routing (HPSR), 2001.

Chekuri et al., "Hardness of robust network design", Proceedings Int'l Network Optimization Conference (INOC), 2005.

Duffield et al., "Resource management with hoses: Point-to-cloud services for virtual private networks", IEEE/ACM Transactions on Networking, vol. 10, No. 5, 2002.

Eisenbrand et al., "An improved approximation algorithm for virtual private network design", Proceedings 16th Annual ACM-SIAM Symposium on Discrete Algorithms (SODA), 2005.

Eriebach et al., "Optimal bandwidth reservation in host-model VPNs with multi-path routing", IEEE Infocom, 2004.

Fingerhut et al., "Designing least cost nonblocking broadband networks", Journal of Algorithms, 1997.

Gupta et al., "Provisioning a virtual private network: A network design problem for multicommodity flow", ACM Symposium on Theory of Computing (STOC '01), 2001.

Gupta et al., "Simpler and better approximation algorithms for network design", ACM Symposium on Theory of Computing (STOC '03), 2003.

Italiano et al., "Design of networks in the hose model", Proceedings ARCANE, pp. 65-76, 2002.

Keslassy et al., "Scaling internet routers using optics", ACM SIGCOMM, 2003.

Kodialam et al., "Efficient and robust routing of highly variable traffic", HotNets III, 2004.

Korotky, "Network global expectation model: A statistical formalism for quickly quantifying network needs and costs", J. Lightwave Technol., vol. 22, No. 3, pp. 703-722, 2004.

Leighton et al., "An approximate max-flow min-cut theorem for uniform multicommodity flow problems with applications to approximation algorithms", Proceedings 29th IEEE Symposium on Foundations of Computer Science (FOCS '88), pp. 422-431, 1988.

Nagesh et al., "Load-balanced architecture for Dynamic Traffic", Optical Fiber Communication Conference (OFC '05), OME67, 2005.

Kumar et al., "Algorithms for provisioning virtual private networks in the hose model", IEEE/ACM Transactions on Networking, vol. 10, No. 4, pp. 565-578, 2002.

Racke, "Minimizing congestion in general networks", Proceedings 43rd Symposium on Foundations of Computer Science, 2002.

Sengupta et al., "Switched optical backbone for cost-effective scalable core IP networks", IEEE Communications Magazine, pp. 60-70, Jun. 2003.

Valiant et al., "A scheme for fast parallel communications", SIAM J. Comput., vol. 11, No. 2, pp. 350-361, 1982.

Zhang-Shen et al., "Designing a predictable internet backbone network", HotNets III, San Diego, CA, 2004.

ITU-T G.7042, "Link capacity adjustment scheme (LCAS) for virtual concatenated signals", 2001.

ITU-T G.8081, "Terms and definitions for automatically switched optical networks (ASON)", 2004.

Bak et al., "Hierarchical load-balanced routing via bounded randomization", Computer Communications and Networks, 1999.

Heusse et al., "A new routing policy for load balancing in communication networks", ACS/IEEE Int'l. Conf. on Computer Systems and Applications, 2001.

\* cited by examiner

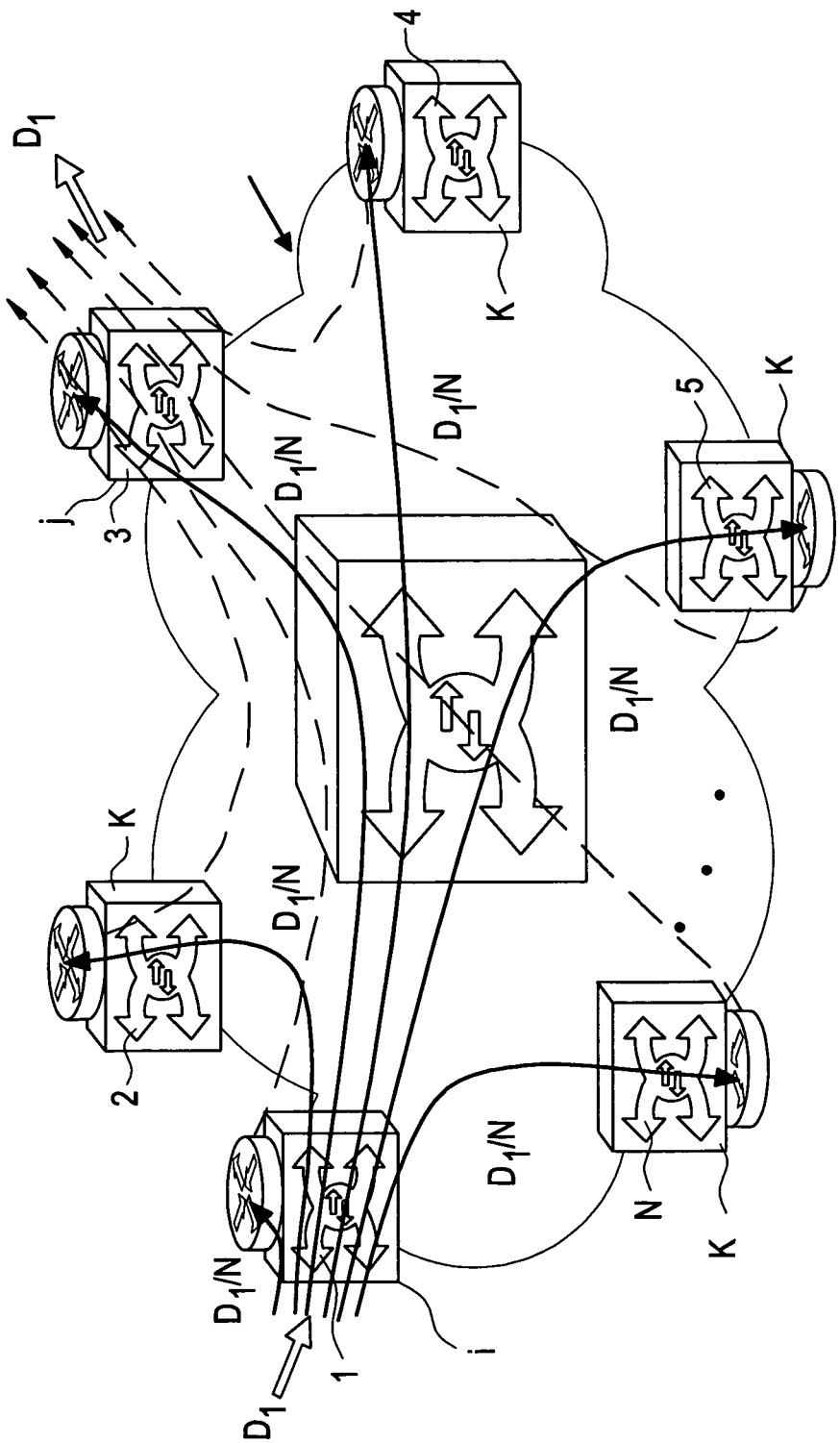

METHODS AND DEVICES FOR PROVIDING INGRESS ROUTING IN SELECTIVE RANDOMIZED LOAD BALANCING

BACKGROUND OF THE INVENTION

Randomized Load Balancing (RLB) across networks is a recently introduced, attractive architecture for handling a high degree of variability in traffic distributions in data networks. Assuming a network of N ingress/egress nodes, RLB works as follows.

Initially, all ingress traffic input to an ingress node i is split into N parts, and each part (i.e., packet or packets) is randomly sent to one of a plurality of other network nodes, called 'intermediate nodes' or 'routing nodes'. Though the traffic is split, no packet header information is used to perform the splitting. Because of this, fully deterministic round-robin scheduling, for example, is as random as a true random traffic splitting (this is referred to as pseudo-random traffic splitting). To complete such splitting a network requires a full logical mesh of circuits between every ingress node and every intermediate node. Each such circuit, i.e., each statically wired connection between two such nodes, is dimensioned to carry $D_i D_j / \Sigma_i D_i$ worth of traffic, where $D_i$ is the ingress/egress capacity of node i and $D_j$ is the ingress/egress capacity of a routing node j.

After receiving a split portion of the original ingress traffic/packets from each ingress node, each of the N routing nodes is operable to identify the packet headers in the traffic and determine the packets' final destination.

The packets in each split traffic portion are then sent to their final destinations (e.g., the 'egress nodes') by each of the N nodes using, again, a full logical mesh of circuits, dimensioned to carry $D_j D_k / \Sigma_j D_j$ worth of traffic, where $D_j$ is the ingress/egress capacity of the intermediate node j and $D_k$ is the ingress/egress capacity of the final destination. Thus, the total capacity of each circuit (for both the traffic splitting step and the traffic routing step) is $2 \times D_j D_k / \Sigma_j D_j$.

It has been shown that so-called, Selective Randomized Load Balancing (S)RLB improves the performance of RLB by selecting a smaller number of nodes M as routing nodes, where M<N, across which load balancing is performed (see for example, U.S. patent application Ser. No. 11/086,555 entitled "Methods and Devices for Routing Traffic using Randomized Load Balancing", assigned to the same assignee as the present application and incorporated by reference herein in full as if set forth in full herein). Further, U.S. patent application Ser. No. 11/086,555 sets forth methods for competing an optimum set of M nodes from among N ingress nodes.

There are, however, several drawbacks to RLB and SRLB. One is that (S)RLB may introduce packet missequencing, leading to the need for packet reordering. To overcome this problem, splitting operations may be performed on entire logic flows rather than on packets, i.e., each flow rather than each packet is sent to a different routing node, (see for example, U.S. patent application Ser. No. 10/785,352 entitled "Load Balancing Method and Apparatus for Ethernet Over SONET and Other Types of Networks", assigned to the same assignee as the present application and incorporated by reference herein in full as if set forth in full herein). This method, however, is primarily effective when a sufficiently large number of sufficiently small flows are present, assuming a finite buffering capability. Even if (S)RLB is performed across individual packets it may happen that an unlucky random splitting constellation leads to buffer overflow at the intermediate node. Another problem associated with (S)RLB is its support for best-effort traffic: (S)RLB is designed to handle all possible traffic matrices equally well. It does not distinguish between different traffic classes. Therefore, class B (best-effort) traffic is treated with the same quality as class A (guaranteed) traffic, which makes networks that utilize (S)RLB expensive to operate when majority of the traffic is best effort type of traffic.

SUMMARY OF THE INVENTION

To overcome the above mentioned limitations of (S)RLB, additional complexity can be put into traffic splitting schemes at ingress (edge) nodes. This allows the splitting process to be less than completely random. Recognizing this, the present inventors discovered methods and devices for splitting traffic in (S)RLB-based networks in an intelligent way.

More specifically, embodiments of the invention are directed at methods and related devices for providing ingress routing in (S)RLB networks that comprises: filling up all statically configured circuits that directly connect an ingress node with one or more intermediate nodes and/or that directly connect an intermediate node with one or more egress nodes representing a final destination, with a portion of traffic destined for those intermediate or egress nodes rather than randomly distributing that portion of the traffic among the intermediate nodes; and using any remaining capacity of the circuits for routing best effort traffic using either SRLB or direct routing.

BRIEF DESCRIPTION OF THE DRAWINGS

FIG. 1 depicts an example of a (S)RLB network that utilizes methods and device provided by the present invention.

DETAILED DESCRIPTION OF THE INVENTION WITH EXAMPLES

In accordance with one embodiment of the invention, the problems associated with the handling of best effort traffic can be overcome by identifying packet headers and prioritizing traffic according to some pre-specified rules. For example, an ingress node (e.g., router), such as node i in FIG. 1, would not just randomly split its ingress traffic $D_1$ and distribute it to M intermediate nodes, but would rather look up the packet headers and begin to fill up all of its direct circuits, (i.e., the statically configured links leading directly to the final destination of the packet via one or more intermediate nodes k and/or that directly connect an intermediate node k with one or more egress nodes k representing a final destination) of total capacity $2 \times D_i D_j / \Sigma_i D_i$ with traffic destined for that specific node j. By doing so, some fraction of the traffic is routed directly, which frees up half the capacity in the network that is reserved for the second routing stage in the (S)RLB scheme with random splitting. This freed up capacity can now be used to route additional best effort or guaranteed traffic to its final destination.

If the traffic destined for node j exceeds the available circuit capacity and cannot be sent directly, it may either be sent on a randomly or pseudo-randomly picked alternative circuit (or by using some additional priority rules). These additional rules may, for example, specify the order by which intermediate nodes are selected for routing i-j traffic. If the nodes in the vicinity of the final destination are selected as intermediate nodes, delay and delay-related jitter will be minimized. Alternatively, the decision as to which intermediate nodes to use may also be based on congestion information of other links or nodes as well as on other parameters known to those skilled in the art.

While the discussion above was aimed at overcoming problems related to the routing of best effort or guaranteed traffic, we now turn our attention to solving problems associated with buffer overflows.

In order to avoid large buffers or buffer overflow at intermediate nodes, the present invention provides methods and devices for performing traffic splitting on a destination basis. In one embodiment, an ingress node may sort all traffic $D_1$ into N−1 groups, based on the traffic's final destination j and then perform random or pseudo-random traffic splitting within each of the N−1 groups. This way traffic randomization becomes smoother and awkward traffic patterns, that may cause buffer overflow at intermediate nodes when the splitting does not take into account the traffic destination, are substantially eliminated.

The last topic we will discuss is packet missequencing. In yet a further embodiment of the invention, to avoid missequencing and the need for re-sequencing buffers, an ingress node can split its traffic among a subset of routes with similar overall propagation delays. The choice of routes may be based on quality-of-service constraints for different traffic classes.

The methods discussed above enable the use of (S)RLB for best-effort traffic, among other types of traffic, which significantly increases the practical relevance of this attractive network architecture. Further, it allows for a variety of ways to perform traffic engineering in (S)RLB, geared towards different performance benefits. The methods and related devices discussed above are just examples illustrating the ideas underlying the present invention. The true scope of the invention is described in the claims that follow.

We claim:

1. A method for providing intelligent ingress routing in selective, randomized load balanced based (SRLB) networks comprising:

receiving incoming traffic, packet header information at an ingress node and determining an egress node associated with the header information;

identifying all intermediate nodes, associated with the determined egress node, that comprise statically configured circuits that directly connect the identified intermediate nodes with the ingress node;

routing the incoming traffic to the identified intermediate nodes until all traffic is routed, or until each circuit is full to capacity with traffic; and applying a set of best effort rules to route remaining traffic through the network to the egress node based on a determination that remaining traffic remains to be sent to the egress node.

2. The method as in claim 1 wherein the best effort rules are selected from the group consisting of random, pseudo-randomly, or further priority rules.

3. The method as in claim 1 wherein the intermediate node is a node in the vicinity of a final destination node.

4. A device for providing intelligent ingress routing in selective, randomized load balanced based (SRLB) networks operative to:

receive incoming traffic, packet header information at an ingress node and determine an egress node associated with the header information;

identify all intermediate nodes, associated with the determined egress node that directly connect with the ingress node, comprising statically configured circuits;

route the incoming traffic to the identified intermediate nodes until all traffic has been routed or until each circuit is filled to capacity with traffic; and apply a set of best effort rules to rout remaining traffic through the network to the egress node based on a determination that remaining traffic remains to be sent to the egress node.

5. The device as in claim 4 wherein the set of best effort rules are selected from the group consisting of: random, pseudo-randomly, or further priority rules.

6. The device as in claim 4 wherein the intermediate node is a node in the vicinity of a final destination node.

* * * * *